United States Patent
Tessler et al.

[11] Patent Number: 5,956,393
[45] Date of Patent: Sep. 21, 1999

[54] SYSTEM AND METHOD FOR LIMITING CALL VELOCITY ATTEMPTS IN A PUBLIC SWITCHED TELEPHONE NETWORK

[75] Inventors: Michael Tessler, Memphis, Tenn.; Pierre Belzile, Lachine, Canada; Charles Meubus, Westmount, Québec, Canada

[73] Assignee: Nortel Networks Corporation, Montreal, Canada

[21] Appl. No.: 08/772,257

[22] Filed: Dec. 23, 1996

[51] Int. Cl.$^6$ ............................ H04M 3/00; H04M 15/00
[52] U.S. Cl. ........................ 379/197; 379/196; 379/137
[58] Field of Search .................... 379/197, 209, 379/221, 196, 198, 219, 220, 249, 139, 207, 201, 210–215, 137, 138, 199, 200

[56] References Cited

U.S. PATENT DOCUMENTS

| | | | |
|---|---|---|---|
| 5,060,258 | 10/1991 | Turner | 379/134 |
| 5,357,564 | 10/1994 | Gupta et al. | 379/207 |
| 5,359,649 | 10/1994 | Rosu et al. | 379/207 |
| 5,408,528 | 4/1995 | Carlson et al. | 379/211 |
| 5,454,033 | 9/1995 | Hahn et al. | 379/198 |
| 5,524,145 | 6/1996 | Parker | 379/197 |
| 5,537,611 | 7/1996 | Rajagopal et al. | 379/221 |
| 5,646,988 | 7/1997 | Hikawa | 379/266 |
| 5,655,013 | 8/1997 | Gainsboro | 379/199 |
| 5,802,157 | 9/1998 | Clarke et al. | 379/196 |
| 5,872,840 | 2/1999 | Wu | 379/197 |
| 5,881,140 | 3/1999 | Gerault et al. | 379/137 |

OTHER PUBLICATIONS

Mase et al. "Advanced Traffic Control Methods for Circuit Switched Telecommunications Networks", IEEE Communications Magazine, Oct. 1990, vol. 28, No. 10, pp. 82–88.

*Primary Examiner*—Harry S. Hong
*Assistant Examiner*—Benny Q. Tieu
*Attorney, Agent, or Firm*—Foley & Lardner

[57] ABSTRACT

The present invention relates to a system and a method for limiting call velocity attempts in the public switched telephone network. A central office of the network is provided with a program element that examines all the physical channels from respective customer premises equipments (CPE). The program element counts the number of times each CPE goes off-hook within a given period of time. This condition is interpreted as an attempt to establish a call through the telephone network. If the number of attempts exceeds a threshold, the physical channel is de-activated for a predetermined time period. De-activation means that call establishment over that channel is negated for all possible destinations. This can be implemented by preventing establishment of dial tone. In a variant, selective de-activation is effected. More specifically, the program element in the central office examines the digits dialed at the CPE and authorizes call establishment only when certain specific destinations are attempted to be reached, such as emergency services (9-1-1 calls, for example). For all other destinations call establishment is denied or delayed. The present invention is particularly useful in controlling repetitive dialing that may overload the telephone network.

30 Claims, 3 Drawing Sheets

SYSTEM AND METHOD FOR LIMITING CALL VELOCITY ATTEMPTS IN A PUBLIC SWITCHED TELEPHONE NETWORK

FIELD OF THE INVENTION

This invention relates generally to limiting the velocity of call attempts on the public switched network. More specifically the invention provides a method and a system for controlling the velocity of call attempts originating from a subscriber's line.

BACKGROUND OF THE INVENTION

There has been a tremendous growth of data and information services available to subscribers connected to the public switched telephone network such as Electronic Bulletin Boards, Electronic Data Providers, On-line Service Providers and now access to the Internet. Most of these data and information service providers (DISP's) have a limited number of access ports. This results in a high probability that a subscriber attempting to connect to these DISP's will encounter a busy condition. Accordingly, many subscribers program their customer premises equipments (CPE) to continuously redial the DISP after encountering busy until a free access port is found and a connection is made to the DISP. CPE can be programmed to dial many times a minute, representing a load on the network which is several times the engineered load. All switch hardware is engineered to handle a certain number of call attempts per minute based on traditional voice telephony based call models.

In prior art, focus has been on the controlling the number of calls routed within the network to specified destinations. In the article "Kenichi Mase, Hisao Yamamoto, Advanced Traffic Control Methods for Network Management, October 1990 IEEE Communications Magazine", two traffic control methods are described; code blocking and call gapping. Code blocking is a method used to block all calls to a specified destination. Call gapping is a method to threshold the number of calls to a specified destination. That is, the method allows for only one call to be routed to the destination during a specified time interval. Both of these traffic controls can be activated on an area code, an exchange or to a particular destination subscriber number. These traffic controls are applied within the routing network as close to the call origin as possible, preserving network capacity otherwise wasted on ineffective attempts. The contents of this reference is incorporated herein by reference.

The U.S. Pat. No. 5,524,145 in the name of A. M. Parker entitled "Incoming Call Completion Threshold Restriction" granted June 1996 and assigned to Bell Atlantic, also describes a method which has the effect of controlling the number of calls within the routing network. This reference describes a method for thresholding the number of call completions within a given time window to a particular destination in an AIN. The contents of this reference is incorporated herein by reference.

Those methods, however, although useful control call establishment toward specific destinations. This implies that repetitive dialing will still consume valuable network resources, particularity at the call routing level. Thus, there is need in the industry to develop a new method and system to control repetitive dialing, with particular emphasis on controlling the dialing as close as possible to the CPE, thus preventing or at least limiting network overloading.

OBJECTS AND STATEMENT OF THE INVENTION

An object of the present invention is to provide a novel method for controlling call velocity attempts in a public switched telephone network.

Another object is to provide a novel system for controlling call velocity attempts in a public switched telephone network.

As embodied and broadly described herein the invention provides a method for restricting access to a telephone network that includes a central office switch and a plurality of customer premises equipments physically connected to said central office switch by respective physical channels, said method comprising the steps of:

observing at said central office switch at least one of said physical channels to detect attempts by a respective customer premises equipment to initiate a call through said telephone network;

counting a number of call attempts by said respective customer premises equipment detected during a certain period of time;

comparing said number of call attempts to a certain threshold;

impeding call establishment toward at Least one destination for a given period of time, if said number of call attempts exceeds said threshold.

In a most preferred embodiment of the invention two software registers are provided for each subscriber's line connected to the local central office. One register is designated to store the number of call attempts during the current (or active) time period and the second register is used to store the number of call attempts during the next time period. As call attempts are made on a particular subscriber's line, the system monitors those call attempts and increments the register for each call attempt.

Prior to proceeding with a call establishment, the system would check that the number of call attempts by that subscriber's line did not exceed the maximum number of call attempts allowed by the system. If a call attempt does not exceed the maximum number of allowed call attempts then the system would proceed to process the call normally. If the call attempt exceeds the maximum number of allowed call attempts, the call is impeded. Also the system impedes any additional calls on the line until the next specified time period. Impeding a call covers two distinct possibilities. The first is to disable the line at least toward one destination, preferably toward all destinations. The second is to introduce a delay in the call establishment toward at least one destination, preferably toward all destinations. Disabling the line toward all possible destinations means that the central office will simply ignore any input by the CPE connected to that line. Thus, it will not be possible for the subscriber to originate any telephone call on that particular line. In a most preferred embodiment, disabling the line also involves precluding dial tone. This procedure prevents a modem or any other type of automatic dialing system to attempt a call since those devices are usually designed to abort calling if no dial tone is present on the line. Delaying call establishment can be implemented by delaying by a specified time period the dial tone.

The predetermined time period over which a count of call attempts is made is usually in the order of few minutes. Once that period of time has elapsed, the control system then toggles registers and begins accumulating the number of call attempts in the second register. At every register toggling event, the target register (the one that keeps the count for the time period that begins) count is restored to zero. Two registers are used to enhance real time performance of the system. Every time the registers are toggled it suffices to start counting in a different register. This operation requires very little processor time and for all practical purposes is transparent to the user. During the time one of the registers is being used as current accumulator, the processor proceeds to clear the other register so at the next register toggling event the target register will be reset. Theoretically, it is possible to use a single register that is cleared at the expiration of each time period. This operation, however, may have a noticeable impact on the real time performance of the system since a number of processor operations are involved, namely writing a value in the register, etc. in order to clear it. Considering that the processor would normally clear the registers associated with each line connected to the central office simultaneously (the time periods associated with each line are synchronized so they begin and expire concurrently) this may create a significant processor overload occurring at specific instants in time.

The new method under the present invention allows to control the number of call attempts that one subscriber can generate within a predetermined time interval. Beneficially, this method would allow a better match of the allocation of switch network resources to the grade of service (GOS) that has been subscribed to, and to the corresponding tariff. It would additionally lead to higher network efficiency, significant operational savings to the telco and protection of public switch network customers from abusive call patterns. The present invention additionally provides the following benefits over prior art systems:

minimal resource consumption for call admission screening, which translates into very low cost per call attempt for effective network abuse protection;

"treatment" can be delayed (dead air followed by fast busy or other) to prevent immediate redial by CPE which detects busy;

provides implicit protection against some forms of abusive calling patterns, for example, where an auto-dialer is set to cycle through a long list of numbers.

In a first variant of the invention, a parameter of the admission policy, such as the maximum number of call attempts could be set dynamically based on the history of counts accumulated in the register, in order to provide progressive throttling of call attempt velocity. It is also possible to vary the thresholds beyond which line de-activation is invoked in dependance upon a number of parameters such as time of day or network traffic status. During late hours, when the network is lightly loaded the permissible number of call attempts can be increased. This may be implemented either by increasing the threshold value and keeping the time periods constant or keeping the threshold value unchanged while lengthening the time period. For instance, instead of totaling call attempts over a single time period it is possible to make a total over two or more consecutive time periods.

A number of different possibilities also exist in connection with the manner the line is treated when the permissible number of call attempts has been reached. As discussed earlier, one possibility is to de-activate the line which for all practical purposes prevents call establishment toward all possible destinations. A possible refinement is to implement selective line de-activation to allow calls to be established toward one or more critical destinations, such as emergency services. This implies that the program element in the central office in addition to counting the number of call attempts also inspects the digits dialed and compares them with telephone numbers stored in a table. If a match is found then the call is allowed to proceed, otherwise the call is blocked.

As embodied and broadly described herein the invention also provides a system for use in a central office switch for restricting access to a telephone network, the central office switch being connected to a plurality of customer premises equipments by respective physical channels, said system comprising:

means for observing at least one of said physical channels to detect attempts by a customer premises equipment connected to said one physical channel to initiate a call through said telephone network;

means for counting a number of call attempts by the customer premises equipment associated with said one physical channel detected during a certain period of time;

means for comparing said number of call attempts to a certain threshold;

means for impeding calls over said one physical channel toward at least one destination for a given period of time, if said number of call attempts exceeds said threshold.

DESCRIPTION OF PREFERRED EMBODIMENTS

Figure 1:
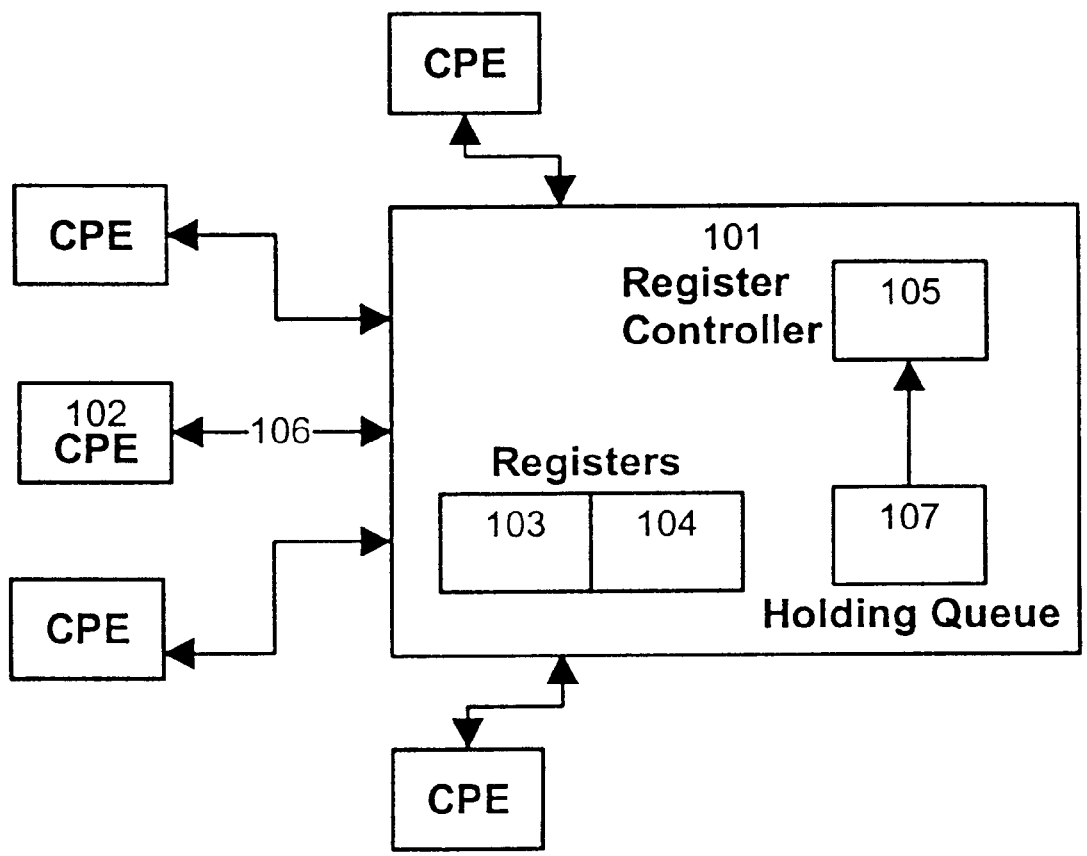
FIG. 1 is a simplified block diagram showing an arrangement of CPE interconnected with a switched telecommunications network for illustrating operation of the invention.

FIG. 1 very schematically illustrates the elements involved in the operation of the invention. That drawing broadly depicts a telecommunications system made up of a customer premise equipment (CPE) terminal 102 having an interconnection 106 to a central office switch 101. Actually, a plurality of CPE 102 are connected to the central office switch 101. However, since the procedure implemented for each CPE 102 are the same the following description will be focused on a single CPE, being understood that each CPE connected to the central office switch for which the control procedure under the present invention is applicable is processed in the same manner. For the purpose of this invention, software registers 103 and 104 are allocated in the switch 101 and associated with the interconnection 106. These software registers tally call attempts performed by a subscriber using terminal 102. A register controller 105 is responsible to manage the tally registers as calls are attempted. Several registers may be allocated against interconnection 106 if required in order to provide per-line control of virtual lines, for addressable sets on the interconnection (e.g., ISDN terminals), or for multi-channel interconnections (e.g., ISDN Basic Rate Access).

The maximum number of calls that a subscriber may attempt within an interval and the duration of that interval are provisioned in switch 101. The activation of the invention may also be provisioned. For each line that is defined in switch 101, registers 103 and 104 can be automatically allocated and assigned to the line. Other register allocation schemes are also possible. For example, these registers may only be assigned to specially identified lines, allocated only when the invention is activated, etc.

Register controller 105 indicates which tally register (103 or 104) is serving as the accumulator for the current interval. As the invention is activated, the register controller process is started. This process contains a continuous timer set at the duration of one interval. When the timer elapses, the active register selector is toggled to the alternate register. For example if register 103 was active then register 103 will become inactive and register 104 becomes the new active register. The inactive registers are cleared in preparation of the next interval.

Figure 2:
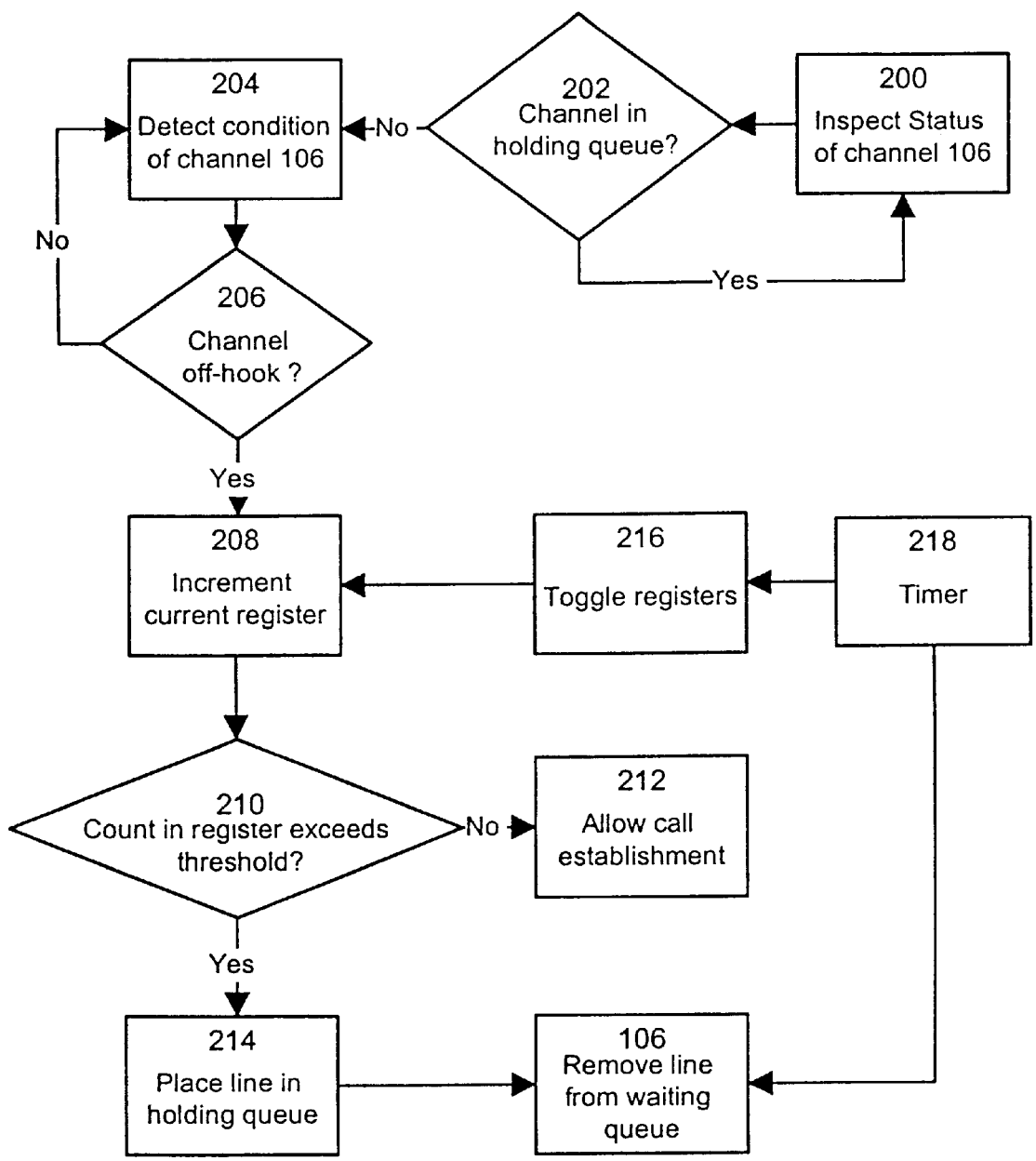
FIG. 2 is flow chart illustrating the events occurring in the central office when a subscriber is attempting to initiate a call.

The flowchart in FIG. 2 illustrates the events occurring in the central office switch 101 that allow to limit velocity of call attempts by a certain subscriber. Note that those events are associated with each line connected to the central office switch, thus the process is repeated entirely for every such line. Note that some channels may be exempted from this processing due to their nature, such as emergency service channels or their attribute. Thus, re-dial control may be enforced on some channels only and not necessarily on all channels connecting with the central office switch 101. The process begins by inspecting the status of the physical channel 106 at step 200. If the channel has been de-activated (the channel is in a holding queue) no further steps are taken and the verification is repeated until the line is activated again. However, if the line is active as shown by decision step 202 the system verifies if the line is off-hook at step 204. An off-hook condition is interpreted as an attempt to establish a call through the public telephone network. If no off-hook condition is determined the decision step 206 returns control back to step 204. On the other hand if an off-condition is observed, the number stored in the currently active register (register 103 or 104) is incremented at step 208. The content of the active register is then compared with the maximum number of calls allowed at step 210. If the limit has not been reached then the call is allowed to proceed normally as shown at step 212. Otherwise the current call is aborted, the channel is placed in holding queue 108 and de-activated. This is shown at step 214. During the time period the channel is in the holding queue, there is no possibility for the subscriber to initiate any calls. Typically, dial tone establishment on the channel is prevented and the subscriber receives silence in the voice path. Alternatively, it is possible to provide a tone (e.g., reorder tone) to terminal 102 before de-activating the channel.

Register controller 105 is responsible for re-activating the channels in the holding queue. As explained above, this queue contains all the channels which attempted to exceed their allowed number of calls in the current interval. After switching to the alternate set of registers, as described in greater detail below, register controller 105 resumes normal call processing for the channels found in the queue. This is done by removing them from the holding queue and informing their controlling agent of their re-activation. For off-hook channels this causes dial tone to be applied or silence to continue depending on the configuration of switch 101. For on-hook channels, detection of call attempts is restored.

As mentioned in the above paragraph, at the expiration of a certain time period, that can be set to say 3 minutes, the channels in the holding queue are re-activated and also the register controller 105 toggles registers, as depicted by the step 216 in FIG. 2. This event can be controlled by any suitable timer mechanism as depicted at 218.

When the registers are toggled, the register controller 105 clears the non-active register so when it becomes the target during the next cycle, it will be reset and contain a zero count.

Adaptive throttling of the number of allowed calls is also possible on a subscriber's basis. The previous paragraphs described a throttling method where a unique switch-wide limit is imposed for each subscriber. This method can be further refined to provide a dynamic limit per subscriber. This limit can then be adapted to reduce or increase the number of allowed calls. For example, the limit can be progressively reduced upon detection of a repetitive dialing event. When repetitive dialing stops, the limit is progressively restored to a nominal level. This throttling method has the advantage of reducing the abuse of switch resources during repetitive dialing events.

Decreasing the subscriber's limit is performer when the active register exceeds the current value of the limit upon a call attempt. As the channel is placed in holding queue 107, the limit is decreased. The new value of the limit is then used for calls during the next interval. The new value for the limit can be computed using any appropriate filter. In order to provide a longer history of call attempts registers 103 and 104 are expanded as a single vector, that could be allocated against all channels or only for channels which are being adapted and are in the adapted channel queue. An associated index would indicate which vector slot is used as the current accumulator for the current period.

Restoring the limit to its maximum value after the repetitive dialing event requires that an "adapted channel queue" be introduced. This queue holds all channels which have been reactivated with a reduced limit. At the end of each interval, the value of the limit of each channel in this queue is increased as computed using any appropriate filter. If the limit reaches the maximum value as provisioned in switch 101, the channel is removed from the queue. Channels are added to this queue when removed from the holding queue 107 at the end of each interval. If a channel in the adapted line queue is re-inserted in the holding queue, its limit will be reduced again as explained in the previous paragraph and the channel is removed from the adapted queue. Because of this channel migration between queues, it may be more convenient to maintain a single queue but to distinguish between held (de-activated) channels and channels having their limit progressively restored.

Figure 3:
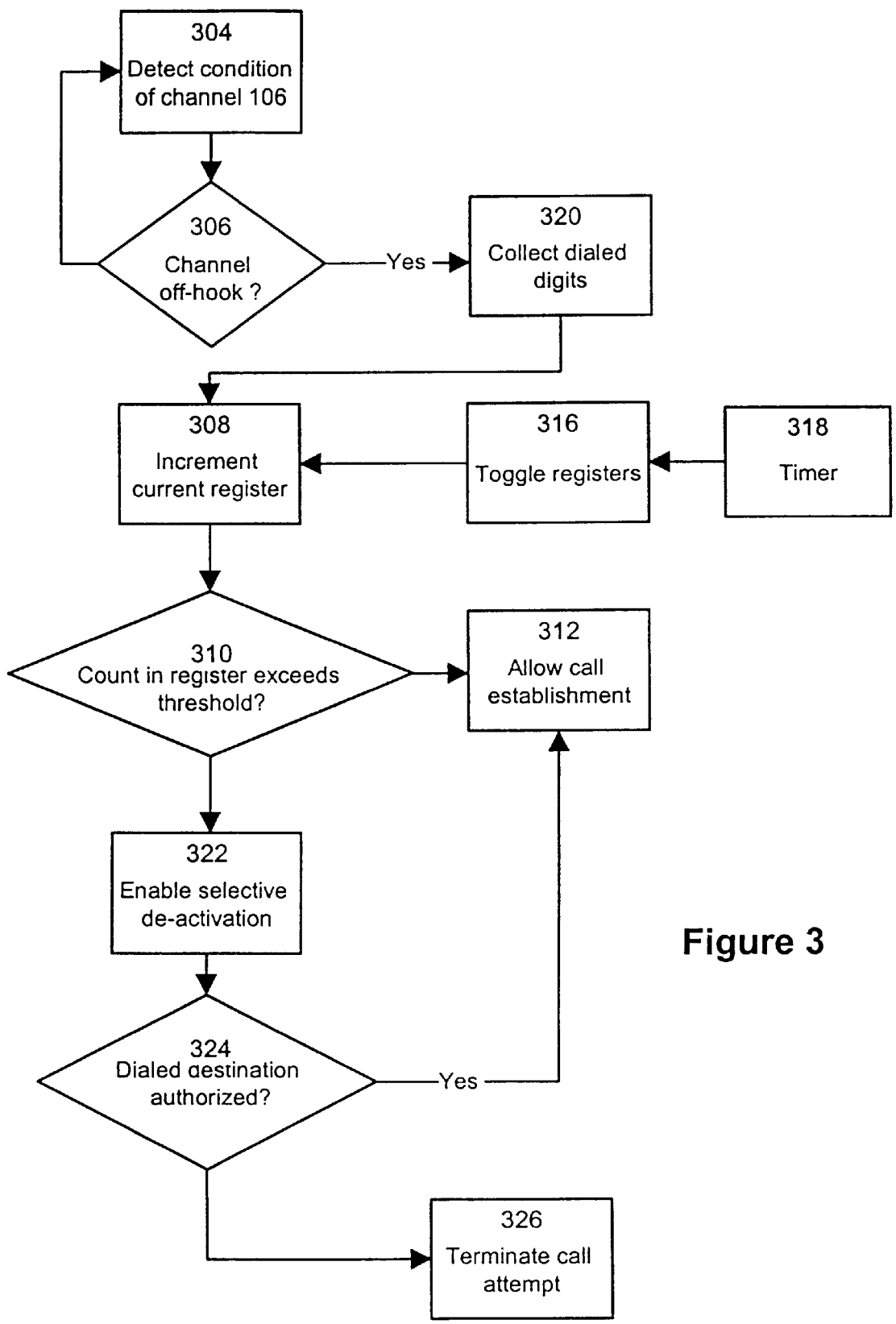
FIG. 3 is flow chart illustrating the events occurring in the central office when a subscriber is attempting to initiate a call, when a variant under the invention is implemented.

Another possible refinement is to provide selective channel de-activation to allow the establishment of calls at least toward certain call destinations that may be critical, such as emergency services. The flowchart of the process is depicted in FIG. 3. Most of the steps are similar to those of FIG. 2, with three notable differences. First, the step of inspecting the channel status at the beginning of the process is removed since some action on the channel reeds to be taken even when it is in the holding queue. Second, a step 320 that collects the digits dialed at the CPE 102 is provided. Third, the holding queue 107 is removed and replaced by steps 322, 324 and 326. At step 322 selective channel de-activation is enabled as a result of a repetitive dialing event. At decision step 324, the dialed telephone number is compared with one or more authorized destinations, such as 9-1-1 for example. If no match is found the call attempt is terminated at step 326. Otherwise, the call is allowed to proceed normally. This procedure is maintained until the predetermined time period elapses that causes a register toggling event and as a consequence, the channel acquires full activation status.

In a yet another refinement the deactivation period is distinct than the remaining portion of the current interval. When the active register is increment and its content is found to exceed the maximum number of calls allowed, the line can be de-activated for a duration different than the remaining portion of the current internal. The de-activation duration can be a fraction, a multiple of the interval duration, or can be independent of it.

As the line is de-activated and placed on the holding queue, the absolute time to re-activate it is computed and stored. Register controller 105 is then enhanced to periodically scan the holding queue and return to service its channels for which the de-activation duration has expired. The intervals between scans of the queue defines the granularity of the de-activation duration. Both can be configured for a given central office switch.

The above description of a preferred embodiment should not be interpreted in any limiting manner since variations and refinements can be made without departing from the spirit of the invention. The scope of the invention is defined in the appended claims and their equivalents.

We claim:

1. A method for restricting access to a telephone network that includes a central office switch and a plurality of customer premises equipments physically connected to said central office switch by respective physical channels, said method comprising the steps of:

observing at said central office switch at least one of said physical channels to detect attempts by a respective customer premises equipment to initiate a call through said telephone network;

counting a number of call attempts by said respective customer premises equipment detected during a certain period of time;

comparing said number of call attempts to a certain threshold;

impeding call establishment through the telephone network toward at least one destination for a given period of time, if said number of call attempts exceeds said threshold.

2. A method as defined in claim 1, comprising the step of de-activating said one physical channel if said number of call attempts exceeds said threshold, whereby negating call establishment over said one physical channel toward all possible destinations during said given time period.

3. A method as defined in claim 2, comprising the step of restoring said one physical channel after said given time period has passed, whereby authorizing call establishment over said one physical channel after said given time period has passed.

4. A method as defined in claim 2, comprising the steps of:
   a) keeping a count of a number of call attempts observed at said one physical channel occurring from a predetermined point in time;
   b) incrementing said count for every new call attempt observed at said one physical channel;
   c) comparing the count reached at step b) with said threshold;
   d) authorizing call establishment through said network if the count at step b) has not exceeded said threshold;
   e) de-activating said one physical channel if said count at step b) exceeds said threshold.

5. A method as defined in claim 4, comprising the step of incrementing the count of call attempts observed at said one physical channel from said predetermined point in time over said certain time period.

6. A method as defined in claim 5, comprising the step of resetting said count at an expiration of said certain time period, whereby allowing to determine a number of call attempts observed at said one physical channel from a point in time coincident with the expiration of said certain time period.

7. A method as defined in claim 5, comprising the steps of:
   a) accumulating a number of call attempts observed at said one physical channel from said predetermined point in time in a first register;
   b) at an expiration of said certain time period from said predetermined point in time accumulating a number of call attempts observed over said one physical channel in a second register;
   c) while the number of of call attempts observed over said one physical channel is accumulated in said second register, resetting said first register.

8. A method as defined in claim 2, comprising the steps of:
   observing at said central office switch a plurality of said physical channels to detect attempts by a respective customer premises equipments to initiate a call through said telephone network;
   for each physical channel observed:
      counting a number of call attempts by a respective customer premises equipment occurring during a certain period of time;
      comparing the number of call attempts to a certain threshold;
      blocking calls toward at least one destination for a given period of time over the physical channel, if said number of call attempts exceeds said threshold.

9. A method as defined in claim 2, wherein the step of de-activating said physical channel includes the step of precluding establishment of dial tone over said one physical channel during said given period of time.

10. A method as defined in claim 1, comprising the step of blocking calls over said at least one physical channel toward a plurality of destinations.

11. A method as defined in claim 1, comprising the step of selectively blocking calls over said one physical channel in dependence of a selected destination, for a given period of time if said number of call attempts exceeds said threshold.

12. A method as defined in claim 11, comprising the step of examining data dialed by a subscriber on a customer premises equipment associated with said one physical channel to determine if call establishment should be authorized.

13. A method as defined in claim 12, comprising the steps of:
   storing in said central office data indicative of at least one call destination toward which a call on said one physical channel should be authorized to be established;
   comparing the data dialed by the subscriber to said data indicative of at least one destination;
   authorizing call establishment over said one physical channel if the data dialed by the subscriber corresponds to the data indicative of at least one destination.

14. A method as defined in claim 13, comprising the step of denying call establishment over said one physical channel if the data dialed by the subscriber does not correspond to the data indicative of at least one destination.

15. A method as defined in claim 1, comprising the step of delaying call establishment toward said at least one destination.

16. A system for use in a central office switch for restricting access to a telephone network, the central office switch being connected to a plurality of customer premises equipments by respective physical channels, said system comprising:
   means for observing at least one of said physical channels to detect attempts by a customer premises equipment connected to said one physical channel to initiate a call through said telephone network;
   means for counting a number of call attempts by the customer premises equipment associated with said one physical channel detected during a certain period of time;

means for comparing said number of call attempts to a certain threshold;

means for impeding call establishment through telephone network over said one physical channel toward at least one destination for a given period of time, if said number of call attempts exceeds said threshold.

17. A system as defined in claim 16, comprising means for de-activating said one physical channel if said number of call attempts exceeds said threshold, whereby negating call establishment over said one physical channel toward all possible destinations during said given time period.

18. A system as defined in claim 17, comprising means for restoring said one physical channel after said given time period has passed, whereby authorizing call establishment over said one physical channel after said given time period has passed.

19. A system as defined in claim 17, comprising;
a) means for keeping a count of a number of call attempts observed at said one physical channel occurring from a predetermined point in time;
b) means for incrementing said count for every new call attempt observed at said one physical channel;
c) means for comparing the count reached at b) with said threshold;
d) means for authorizing call establishment through said telephone network if the count at b) has not exceeded said threshold;
e) means for de-activating said one physical channel if said count at b) exceeds said threshold.

20. A system as defined in claim 19, comprising means for incrementing the count of call attempts observed at said one physical channel from said predetermined point in time over said certain time period.

21. A system as defined in claim 20, comprising means for resetting said count at an expiration of said certain time period, whereby allowing to determine a number of call attempts observed at said one physical channel from a point in time coincident with the expiration of said certain time period.

22. A system as defined in claim 20, comprising:
a) a first register for accumulating a number of call attempts observed at said one physical channel from said predetermined point;
b) a second register for accumulating a number of call attempts observed over said one physical channel at an expiration of said certain time period from said predetermined point in time;
c) means for resetting said first register while the number of call attempts observed over said one physical channel is accumulated in said second register.

23. A system as defined in claim 17, comprising:
means for observing at said central office switch a plurality of said physical channels to detect attempts by a respective customer premises equipments to initiate a call through said telephone network;
for each physical channel observed:
means for counting a number of call attempts by a respective customer premises equipment occurring during a certain period of time;
means for comparing the number of call attempts to a certain threshold;
means for blocking calls toward at least one destination for a given period of time over the physical channel, if said number of call attempts exceeds said threshold.

24. A system as defined in claim 17, wherein said means for de-activating said physical channel includes means for precluding establishment of dial tone over said one physical channel during said given period of time.

25. A system as defined in claim 16, comprising means for blocking calls over said at least one physical channel toward a plurality of destinations.

26. A system as defined in claim 16, comprising means for selectively blocking calls over said one physical channel in dependence of a selected destination, for a given period of time if said number of call attempts exceeds said threshold.

27. A system as defined in claim 26, comprising means for examining data dialed on a customer premises equipment associated with said one physical channel to determine if call establishment should be authorized.

28. A system as defined in claim 27, comprising:
means for storing in said central office data indicative of at least one call destination toward which a call on said one physical channel should be authorized to be established;
means for comparing the data dialed on the customer premises equipment to said data indicative of at least one destination;
means for authorizing call establishment over said one physical channel if the data dialed on the customer premises equipment corresponds to the data indicative of at least one destination.

29. A system as defined in claim 28, comprising means for denying call establishment over said one physical channel if the data dialed on the customer premises equipment does not correspond to the data indicative of at least one destination.

30. A system as defined in claim 16, comprising means for delaying call establishment toward said at least one destination.

* * * * *